June 16, 1964 G. BANKO 3,137,104
COUNTER BALANCING APPARATUS FOR MACHINE
TOOL RECIPROCATING TABLES
Filed Aug. 22, 1962 2 Sheets-Sheet 2
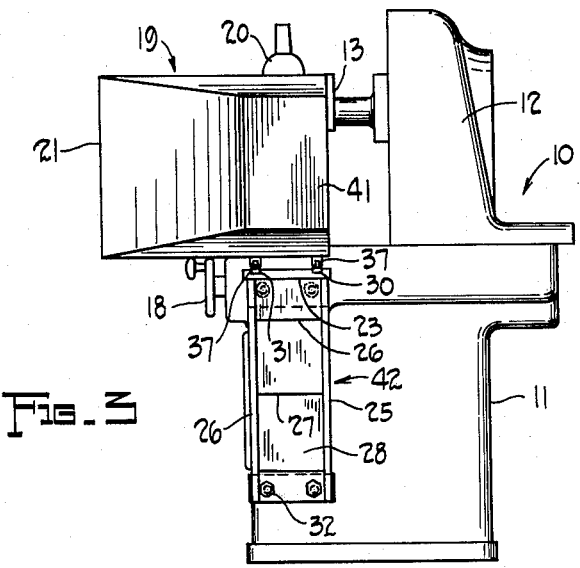
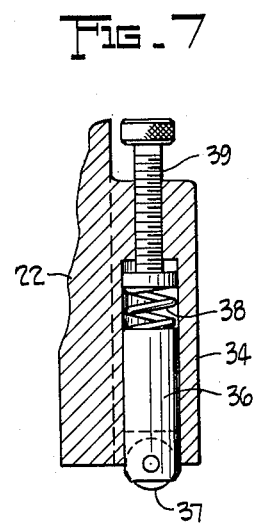
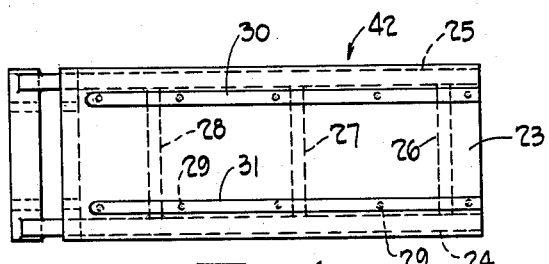
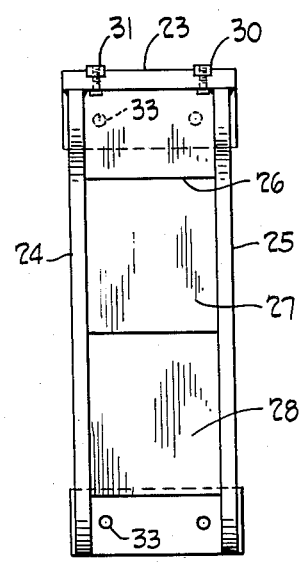
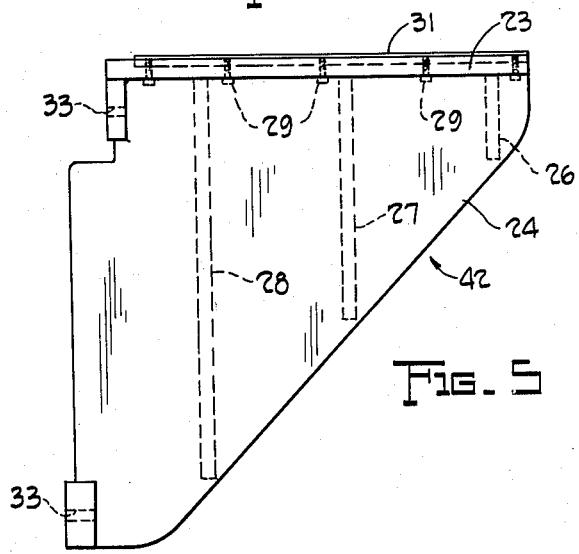
INVENTOR.
GEORGE BANKO
BY
ATTORNEY.

United States Patent Office 3,137,104
Patented June 16, 1964

3,137,104
COUNTER BALANCING APPARATUS FOR MACHINE TOOL RECIPROCATING TABLES
George Banko, 1834 E. 223rd St., Euclid, Ohio
Filed Aug. 22, 1962, Ser. No. 218,607
1 Claim. (Cl. 51—166)

This invention relates to supports and particularly to a counterbalancing platform for auxiliary apparatus mounted on the end of the reciprocating table of a machine tool.

Conducive to a better understanding of this invention, it may be well to point out that in the optical method of profile, image or templet grinding of special shapes, lamination die parts and intricate form tools, it is necessary to mount work illuminating and viewing apparatus on the grinding machine table in such a manner that the work-piece, grinding wheel and optical apparatus are maintained in fixed alignment in all positions of the work being shaped.

The optical apparatus is necessarily mounted at one end of the work supporting table in order to leave the greatest possible table area free to support the work-piece thereon.

An optical viewer capable of projecting an enlarged real image in color, of the viewed face of a work-piece upon an eighteen inch square screen, such as described in my United States Patent No. 2,481,381, issued to me September 6, 1949, entitled "Optical Projection Viewer For Machine Tools," is necessarily rather heavy.

The reason for this being that the viewer structure must be built sufficiently rigid and rugged to prevent vibration, due to the operation of the machine tool, from being communicated to the viewing screen in the form of an unsteady image.

This is especially important when it is realized that magnifications in the order of 100:1 are often employed. The weight of the optical viewer, being necessarily concentrated at the extreme end of the machine table, causes the table to tilt or spring, slightly, when moved to its extreme position, no matter how accurately the table ways may be fitted, since there must be sufficient clearance between the table and the ways to permit relative movement therebetween.

Although the magnitude of this deviation may involve but a few thousandths of an inch, when the table is at its extreme position, even this small variation cannot be tolerated under conditions where accuracy in the nature of one ten-thousandth of an inch is required, as is often the case when mating punch and die elements are to be shaped.

The primary object of this invention, therefore, is to provide a supporting platform for overhanging auxiliary apparatus attached to one end of a machine tool table, such as described in my above mentioned patent, which permits the table to be reciprocated freely on its ways beneath the forming tool, while at the same time positively supporting the auxiliary apparatus so that any tendency of the table to spring or tilt, due to the weight of the attached apparatus, is prevented.

Another object is to provide a device of the type stated that is an improvement over the structure defined in United States Patent No. 2,591,227, issued to me on April 1, 1952, in that it is specifically adapted for use with machine tool tables that reciprocate in a single horizontal plane, without cross-feed.

Further objects are to provide such a device that is economical in cost, easily attached to existing machine tools, and that will maintain its supporting accuracy over a long period of time without requiring inspection or adjustment.

These and other objects of the invention will become apparent from a reading of the following specification and claim, together with the accompanying drawings in which like parts are referred to and indicated by like reference numerals and wherein:

FIGURE 3 is a right end view;

FIGURE 4 is a top plan view of the platform taken along the line and in the direction of the arrows 4—4 of FIGURE 1;

FIGURE 5 is a front elevation of the unmounted platform;

FIGURE 6 is a right end view of the same; and

FIGURE 7 is an enlarged view, partly in section, of the counter-balancing roller and activating spring.

Figure 1:
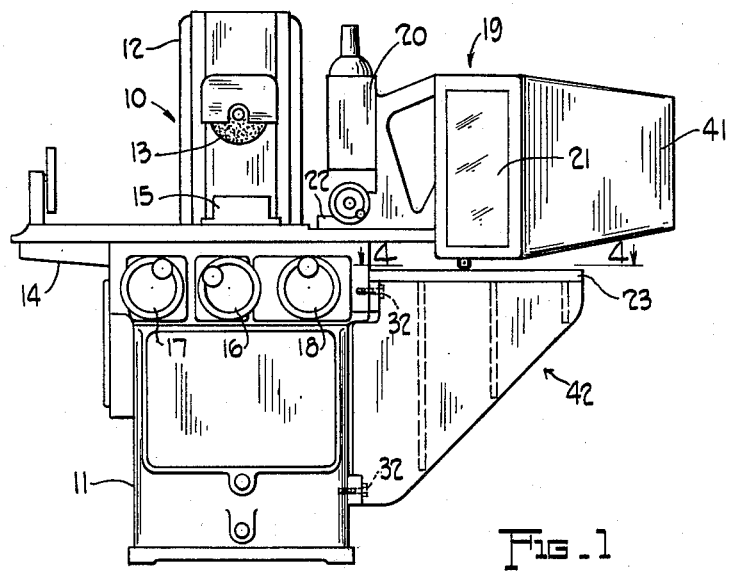
FIGURE 1 is a front elevation of the counter-balancing support that is the subject of this invention showing it combined with a surface grinder and optical viewer.

Referring more particularly to the drawings, there is seen in FIGURE 1 a surface grinder, broadly indicated by reference numeral 10, having a base 11 and a tool holder pillar 12.

A table 14 is mounted on the base 11 and is freely movable in reciprocating motion from right to left, and back again, in front of the pillar 12.

The pillar 12 has a grinding wheel 13 positioned thereon which is adjustable vertically thereof, with reference to the table 14, by means of the hand wheel 17.

The pillar 12 is movable in a horizontal plane toward or away from the table 14. Its movement is controlled by the hand wheel 16, so that the supported grinding wheel 13 may be moved transversely of the table 14.

A work holding fixture, or vise 15, is immovably mounted on the table 14, as seen in FIGURE 1, and can be only manipulated in a single plane, longitudinally of the grinding wheel 13, in response to the table moving hand wheel 18.

Any transverse adjustment of the fixture 15 with reference to the tool 13 is brought about by movement of the pillar 12 toward or away from the table 14.

Reference numeral 19 broadly indicates an optical viewer such as described in my United States Patent No. 2,481,381.

The viewer is intended to be mounted on the extreme end of a machine table such as that identified by the reference numeral 14 of FIGURE 1. As shown therein, the projection system of the viewer 19 must be aligned with the tooled edge of the work-piece so that an enlarged real image of the tool and work-piece is projected in natural color upon the screen 21, which may be scribed with contour guide lines indicating the shape to which the work is to be ground.

An optical viewer constructed as indicated in the above mentioned patent includes a light source 20 and a cabinet 41 containing the necessary lenses and reflecting mirrors by means of which an enlarged real image of the viewed face of the work-piece is thrown upon a ground glass screen 21.

In order to provide the rugged and rigid structure necessary to assure a vibration free image, the device is made of castings and sheet materials of heavy gage. The deforming stress brought to bear on the table end by the weight of this overhanging structure is counter-balanced by the sustaining action of the hereinafter described structure which is the subject of this invention.

The counter-balance consists broadly of two elements, namely, the platform 42 and the carriage 22, each of which will be described in detail herein.

The platform 42 is substantially right-triangular in shape and is mounted on the side of the machine tool base 11 in an inverted position, so that what would normally be regarded as the base of the triangle is upper-most, and forms a horizontally extending shelf 23 that is aligned with the longitudinal center line of the table 14 but in a plane immediately below the table so that the table end can pass above it.

The platform is mounted against the side of the base by bolts 32 which pass through anchoring holes 33.

Reference numerals 24 and 25 indicate spaced sides of the platform which are joined through 3 spaced stiffening walls 26, 27 and 28, as seen most clearly in FIGURES 5 and 6 to provide a structure of maximum rigidity.

Reference numerals 30 and 31 indicate two spaced and parallel rails secured to the top face of the shelf 23 by means of screws 29. The rails 30 and 31 extend the length of the shelf 23 and are positioned parallel to the projected extension of the ways of the table 14.

The carriage 22 comprises a plate that is adapted to be bolted to the top of the table 14 at the end thereof and includes a pair of spaced sockets 34 containing inverted pistons 36 having rollers 37 mounted on the lower ends thereof. These two sockets are spaced so that their rollers 37 will rest and ride on the rails 30 and 31.

A stiff spring 38, whose tension is regulated by a screw 39, is positioned in each socket above the piston 36, as shown in FIGURE 7.

Figure 2:
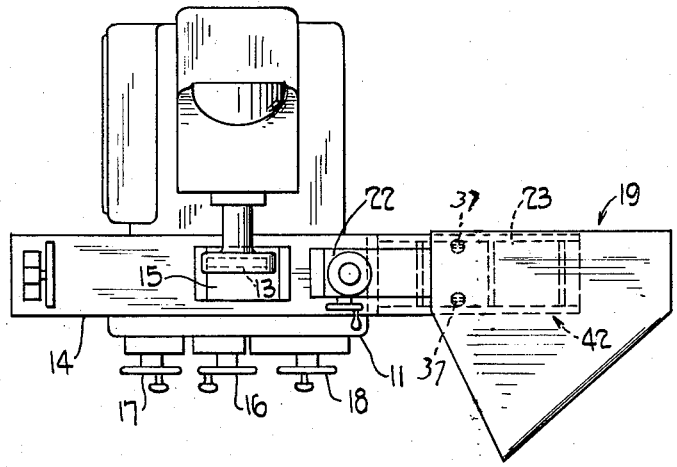
FIGURE 2 is a top plan view of the same.

The optical viewer 19 is mounted on top of the carriage 22, as illustrated in FIGURES 1, 2 and 3.

The tension of the two carriage roller springs 38 is adjusted against the weight of the optical viewer 19 so that the rollers 37 will bear the entire weight of the optical viewer as they ride the platform rails 30 and 31.

Thus the depressing weight of the viewer assembly is equalized and removed from the end of the table 14, thereby insuring the free and level movement of the table, even when moved to its extreme positions on the machine base 11.

The springs 38 act to counterbalance the downward thrust created by the weight of the viewer 19 against the supportive force of the platform 42.

Longitudinal movement of the table 14 causes the carriage roller 37 to travel the length of the platform rails 30 and 31.

It will thus be evident that the weight of the optical viewer, supported by the carriage rollers 37, is transmitted through the platform 42 to the machine base 11, in all possible positions of the table 14, so that there is no deforming overhanging or unbalancing force exerted on the work supporting table 14.

While the optical viewer invented by your applicant has been used to illustrate one application of the counter-balancer, it should be understood that other types of auxiliary apparatus may be so supported in association with reciprocating machine tool tables.

It will now be clear that there has been provided a device of the type stated that is specifically adapted for use with machine tools wherein the work-piece supporting table is limited to simple reciprocating longitudinal movement with relation to a tool holding pillar having its own traverse motion relative to the table.

The instant device provides a more economical and less complicated counter-balancer, that is an improvement over that disclosed in my hereinabove mentioned United States Patent No. 2,591,227.

While the invention has been disclosed in its preferred form, it is to be understood that the specific embodiment thereof, as described and illustrated herein, is not to be considered in a limited sense as there may be other forms or modifications of the invention which should also be construed to come within the scope of the appended claim.

I claim:

In combination with a machine tool of the type having a base with a reciprocating work supporting table mounted thereon and auxiliary apparatus mounted at one end of the table, an auxiliary apparatus counter-balancer, comprising a platform having a pair of right-triangular side walls spaced apart and joined through vertically extending internal braces and a base plate, the platform being adapted to be mounted on the machine tool base in an inverted position with its base plate extending laterally thereof and immediately below and parallel to the travel plane of the reciprocating table, the platform having a pair of longitudinally extending parallel rails mounted on the upper face of its base plate, an auxiliary apparatus supporting carriage rigidly mounted on the end of said table above the platform, the carriage having equalizing means comprising a pair of dependent plungers slidably mounted in vertically extending sockets, having blind bases, aligned with said spaced rails, each of said plungers having a roller mounted on the lower end thereof engaged with one of said paired rails and rotatable on an axis perpendicular to the table ways, a spring mounted in each socket, between the plunger and the socket base, constantly urging the plunger and roller downward against the rail, and spring compression means mounted in the socket base adapted to adjustably press against the upper end of the spring, whereby the over-balancing weight of the auxiliary apparatus upon the table is counter-balanced by the springs and transferred to the machine tool base through the several rollers and platform, in all possible positions of the reciprocating table.

References Cited in the file of this patent

UNITED STATES PATENTS

| | | |
|---|---|---|
| 1,846,341 | Jung | Feb. 23, 1932 |
| 2,591,227 | Banko | Apr. 1, 1952 |